United States Patent

Thompson et al.

[11] Patent Number: 5,713,645
[45] Date of Patent: Feb. 3, 1998

[54] SNOWMOBILE TRACK PROFILE

[75] Inventors: Mark B. Thompson, Providence, Utah; Serge A. Bedard, Valcourt, Canada

[73] Assignee: Bombardier Inc., Montreal, Canada

[21] Appl. No.: 393,109

[22] Filed: Feb. 22, 1995

[51] Int. Cl.[6] ................................................ B62D 55/26
[52] U.S. Cl. ........................................ 305/168; 305/179
[58] Field of Search .................... D12/7; 305/157, 305/165, 167, 168, 169, 178, 179, 181, 160

[56] References Cited

U.S. PATENT DOCUMENTS

| | | |
|---|---|---|
| D. 283,206 | 4/1986 | Talbot . |
| 3,355,225 | 11/1967 | McDowell et al. . |
| 3,598,454 | 8/1971 | Richard .................. 305/169 X |
| 3,619,012 | 11/1971 | Bizier et al. . |
| 3,704,918 | 12/1972 | Perreault . |
| 3,762,779 | 10/1973 | Russ, Sr. . |
| 3,781,067 | 12/1973 | Dodson et al. . |
| 3,857,617 | 12/1974 | Grawley . |
| 3,934,944 | 1/1976 | Forsgren .................. 305/179 |
| 4,217,006 | 8/1980 | Dehnert .................. 305/168 |
| 4,278,302 | 7/1981 | Westimayer et al. ......... 305/181 X |
| 4,991,911 | 2/1991 | Blais ..................... 305/168 |
| 5,005,922 | 4/1991 | Edwards et al. . |

FOREIGN PATENT DOCUMENTS

| | | |
|---|---|---|
| 898862 | 10/1972 | Canada . |
| 949624 | 9/1974 | Canada . |
| 39841 | 11/1975 | Canada . |
| 1132169 | 7/1982 | Canada . |
| 1117570 | 8/1982 | Canada . |
| 2014852 | 10/1990 | Canada . |
| 217455 | 3/1992 | Canada . |
| 2100105 | 1/1994 | Canada . |

OTHER PUBLICATIONS

1990–1991 Roetin Industries Catalog, pp. 1 and 6.
1995 Roetin Industries Catalog, p. 9.

*Primary Examiner*—Russell D. Stormer
*Attorney, Agent, or Firm*—Dorsey & Whitney LLP

[57] ABSTRACT

A snowmobile track comprises an endless belt of reinforced rubber composition and includes on its exterior surface an array of projecting ribs which form traction elements for engaging the snow surface. The ribs have a height of between 1¼ and 2 inches and are angled between 0° and 45° (preferably about 20°) to the transverse direction of the track to provide maximum traction effect in powder snow.

19 Claims, 3 Drawing Sheets

SNOWMOBILE TRACK PROFILE

BACKGROUND OF THE INVENTION a) Field of the Invention

This invention relates to a new or improved snowmobile track designed to provide improved traction, particularly in light or powder snow.

b) Description of the Prior Art

Snowmobile tracks conventionally include on the exterior surface thereof a pattern of projecting ribs or lugs that are designed to engage the snow or other ground surface and apply traction forces thereto to propel the snowmobile. Numerous prior art patents are concerned with different means of improving the traction characteristics of snowmobile tracks, see for example U.S. Pat. No. 3,704,918 Perreault, U.S. Pat. No. 3,762,779 Russ, and Canadian Patent 1,117,570 Skega Aktiebolag, and Canadian Patent Application 2,014,852 published October 18th, 1990 Yokohama Rubber Co., Ltd.

Nevertheless, there remains a need for a snowmobile track configuration that will provide satisfactory traction in soft or powder snow. With existing track configurations, modern day high powered snowmobiles when operating in soft or powder snow have a tendency when power is applied to the track simply to dig a hole in the snow rather than generate effective traction forces between the track and the snow.

SUMMARY OF THE INVENTION

The present invention aims to overcome these difficulties and provide a snowmobile track that is effective particularly in soft or powder snow conditions.

According to the invention there is provided a snowmobile track comprising: an endless belt of reinforced rubber composition having embedded therein at intervals along its length a series of transverse reinforcing rods so that the belt is relatively stiff in the transverse direction while being flexible in the length direction thereof; said belt having opposed major surfaces that comprise an interior side and an exterior side respectively, said interior side being configured with driving formations for engagement by drive means of the snowmobile, said exterior side having integral ground-engaging traction elements formed thereon; said traction elements comprising projecting ribs each having a height of at least about 1¼ inches, the ribs being spaced along the length of the track in a repeating pattern and together extending over most of the width of the track, each said rib extending somewhat in the transverse direction of the track, and the major part of the ribs being angled with respect to said transverse direction at an angle in the range 0° to 45° towards the closest longitudinal edge of said belt.

The ribs have a height of between 1¼ and 2 inches, and their angle to the transverse direction is preferably in the range 15° to 30° and most preferably about 20°.

The ribs taper in thickness towards an elongate crest, and in the region of their crests the ribs, while still being stiff, have a degree of resilient flexibility, preferably having a hardness in the range of 50 to 90, and most preferably about 70 durometer.

The rib crest is preferably flat and to improve traction may include a groove extending longitudinally thereof.

The ribs are preferably in register with the reinforcing rods embedded in the snowmobile track and are discontinuous, having gaps between adjacent ribs, the ribs in one row being aligned with the gaps in the adjacent rows so that the ribs have a repeating pattern corresponding to twice the spacing between the reinforcing rods.

Preferably in alternate rows of ribs there is a central rib that is of wide angled V-shape configuration, the ribs to each side of this central rib being similarly angled in opposite directions, although in one embodiment it is preferred to arrange for ribs located to the outboard side of each row of sprocket holes to be generally parallel to the longitudinal direction.

BRIEF DESCRIPTION OF THE DRAWINGS

The invention will further be described, by way of example only, with reference to the accompanying drawings wherein.

DESCRIPTION OF THE PREFERRED EMBODIMENTS

Figure 1:
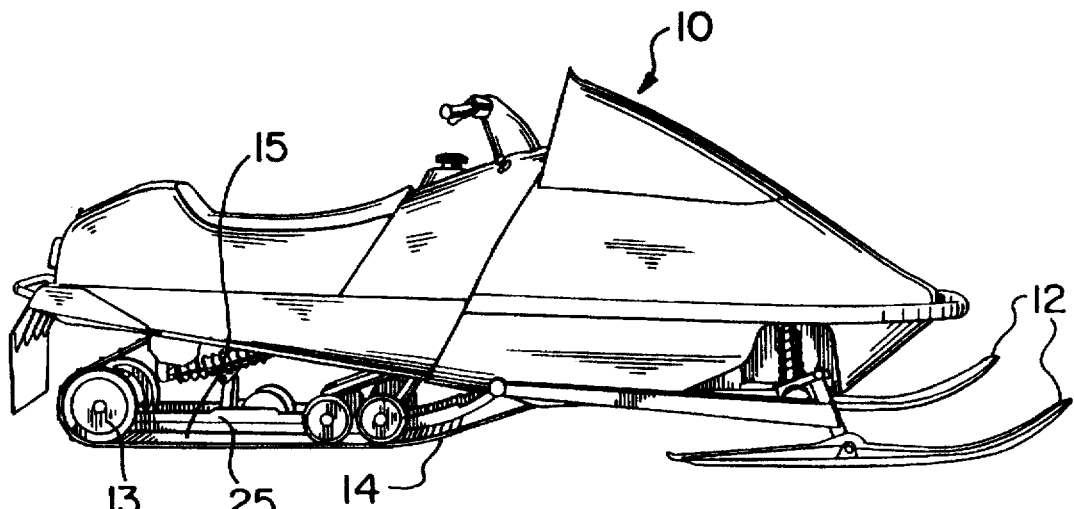
FIG. 1 is a side perspective view of a snowmobile.

As seen in FIG. 1, a snowmobile 10 is supported at its forward end on a pair of steerable skies 12 and at its rearward end on a track 14 in the form of an endless belt which passes in a ground-engaging round beneath a slide suspension 25, and at the rear end passes around idler wheels 13.

The track 14 as is known is fabricated as a moulding of fabric reinforced natural or synthetic rubber, and comprises an endless loop having an exterior side formed with an array 16 of projecting ground-engaging traction elements, and on its interior side has rows of integral projecting drive lugs for engagement by elements of the snowmobile drive train (not shown). Typically the lugs 18 are arranged at regular spacing in longitudinally extending rows, and between the outermost rows the belt is formed with a series of rectangular holes 14. By virtue of its construction the belt is flexible in a longitudinal direction, and it is stiffened in the transverse direction by a series of regularly spaced reinforcing rods 22 (FIG. 5) which extend throughout substantially the entire width of the belt, the thickness of the belt being locally increased in the region of the rods 22 as is evident in FIGS. 2, 5 and 6. The rods 22 pass through the portions of the belt that lie between the successive holes 20, and these portions are reinforced by metal clips 24 of generally C-shaped profile, the ends 24a of which are clinched into the outer side of the track whereas the central portion 24b lie flat against the interior side 15 of the track and form bearing means for engagement with the slide rails of the slide suspension 25, as is well understood in the art.

It will thus be seen that the rows of holes 20 divide the track 14 in the transverse direction into a wide central part 14a and narrower outboard parts 14b, although it will be appreciated that the parts 14a and 14b are integrally connected by the reinforcing rods 22 and the surrounding rubber material. Intermediate the location of the successive reinforcing rods 22, the exterior side 17 of the track 14 is recessed and formed with a series of shallow transversely extending corrugations 19.

The array 16 of ground-engaging ribs on the exterior side of the track is shown as comprising a longitudinally extending row of center ribs 26a on each side of which is a row of angled flank ribs 26b whereas the outboard portions of the track each carries a further row of angled ribs 26c.

Figure 2:
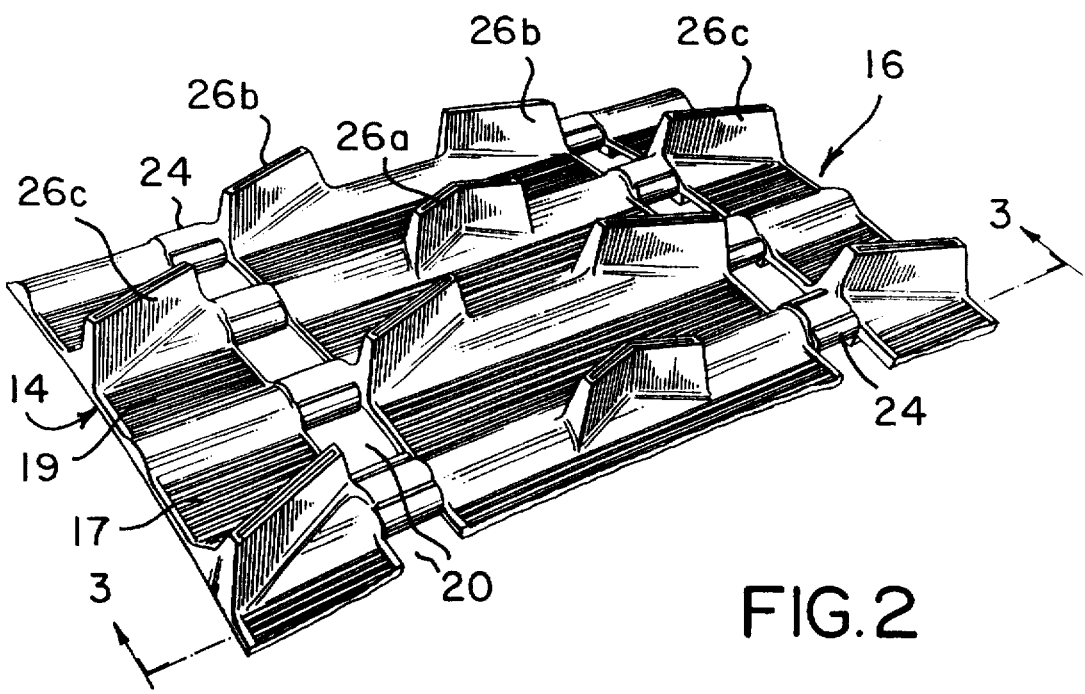
FIG. 2 is an enlarged perspective view of a section of the snowmobile track showing the configuration of the exterior side thereof.
Figure 4:
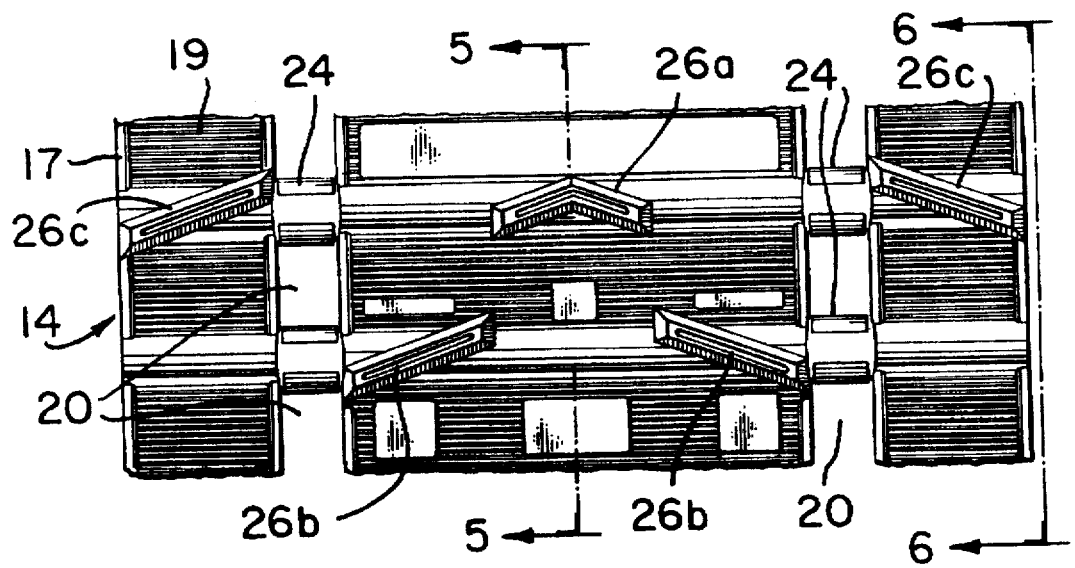
FIG. 4 is a plan view corresponding to FIG. 3.
Figure 5:
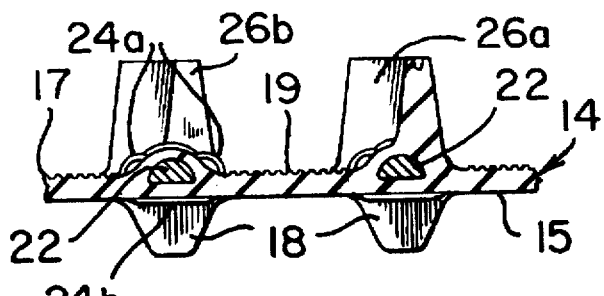
FIG. 5 is a sectional view taken on the line 5—5 in FIG. 4.
Figure 6:
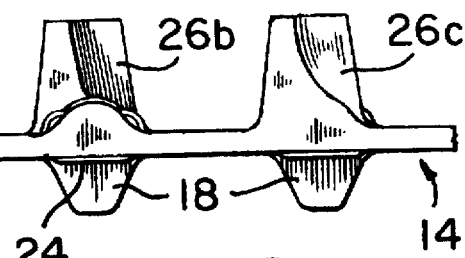
FIG. 6 is a view taken on the line 6—6 in FIG. 4.

From FIGS. 2 and 4 it will be seen that the center ribs 26a are of wide angled V-shaped configuration having opposed limbs that are rearwardly angled from the transverse direction by about 20° so that the rear included angle between them is about 140°. The flank ribs 26b the outboard ribs 26c likewise angled outwardly to the rear at about 20°, and as shown in FIG. 5, all ribs are substantially in register with one or other of the reinforcing rods 22.

Figure 3:
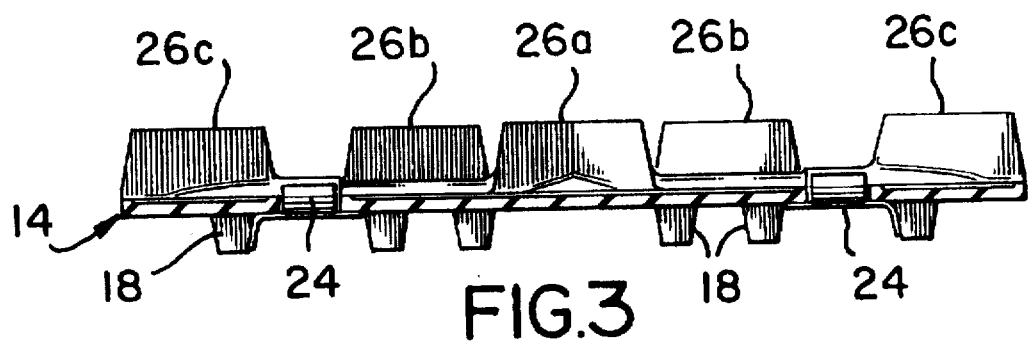
FIG. 3 is a sectional view taken on the line 3—3 in FIG. 2.

Considered in total, the ribs 26a, 26b, 26c extend over substantially the entire width of the track except for the region of the holes 24, and this is shown in FIG. 3. However the individual ribs are spaced apart by substantial distances so that no rib occupies more than about ⅕ of the width of the belt. The outboard ribs 26c are aligned with a center rib 26a, leaving substantial gaps therebetween as seen in FIG. 4, the flank ribs 26b (registering with the adjacent reinforcing) rod being substantially aligned with these gaps. Thus the individual ribs, although spaced over substantially the entire outer side 17, are spaced from one another and provide a repeat pattern that corresponds to about twice the distance between adjacent reinforcing rods 22.

The above described arrangement of traction ribs is beneficial in terms of tractive effort since successive registering ribs are spaced a sufficient distance apart in the longitudinal direction that there is an adequate amount of snow between them to resist the shearing and compaction action of the ribs. Furthermore, because of the angulation of the ribs, their interaction with the snow ground surface is such as to retain the snow within the area of the track rather than pushing it laterally outwards. This provides good tractive effect and floatation of the track, which is particularly important in light powdered snow. Although the ribs are relatively deep, 1¼ inches as shown, but in some cases depending on the application perhaps as much as 2 inches in height, they do not add excessively to the weight of the track because of the configuration and spacing of the ribs as shown in the drawings and discussed above, i.e. the ribs are relatively small in length and widely spaced.

As well as providing good tractive effect, the angled arrangement of the ribs provides effective directional control during steering action, and furthermore enhance the stability of the vehicle against side slip when traversing hillsides. Additionally, in braking, the configuration of the ribs is highly effective in providing a large surface for engagement between the track and the snow.

Figure 7:
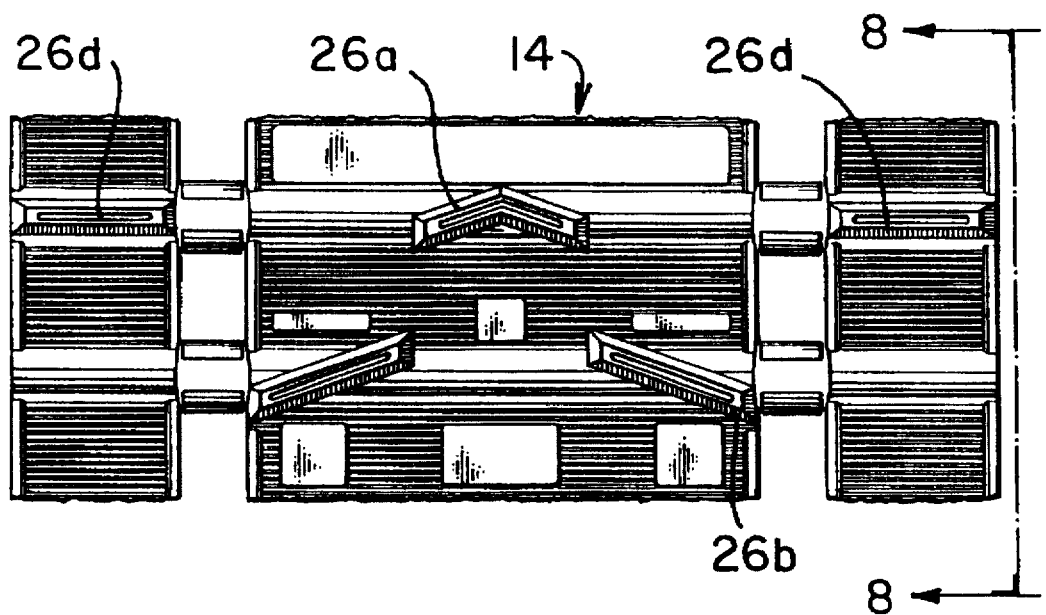
FIG. 7 is a view corresponding to FIG. 4 showing an alternate configuration.
Figure 8:
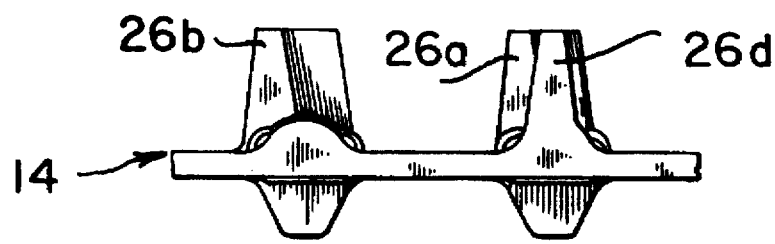
FIG. 8 is a view taken on the line 8—8 in FIG. 7.

A modification is shown in FIGS. 7 and 8. The track shown herein is essentially the same as the one described in relation to FIGS. 2 to 6 except that it has rows of outboard ribs 26d that extend transversely, rather than at an angle.

In both embodiments, the flat crest of the ribs has a longitudinally extending groove 30 that effects improved traction when running on icy surfaces. The ribs are preferably relatively stiff, but embody a degree of resiliency, particularly in the region of the crests thereof. Thus the hardness of the rubber adjacent the crests is preferably about 60 to 70 durometer, although it may vary substantially, e.g. from 60 to 80 durometer. The hardness of the rubber in the base portion of the ribs and in the remainder of the track is preferably about 80 durometer.

In both of the embodiments described in relation to FIGS. 4 and 7 the total width of a center rib 26a and an adjacent pair of flank ribs 26b in the transverse direction is equal to the spacing between the two rows of sprocket holes 20 so that when viewed in the longitudinal direction the inboard ends of the flank ribs 23 are in register with the outboard ends of the center rib 26a. This relationship can be varied as desired. For example the flank ribs 26b could be extended at their inboard ends (or the center rib 26a could be extended at its outboard ends) to create an overlap as viewed in the longitudinal direction. Alternatively these ends of the ribs 26b or 26a could be shortened to create gaps as viewed in the longitudinal direction.

As shown the center rib 26a occupies approximately 44% of the distance between the rows of sprocket holes 20, each flank rib 26b occupying approximately 28% of this distance.

As shown in FIGS. 3 and 7, the limbs of the center rib 26a are angled rearwardly from the transverse direction by about 20°. This angle can be varied widely, and could be as much as 45°.

What we claim as our invention is:

1. A snowmobile track comprising:
    an endless belt of reinforced rubber composition having embedded therein at intervals along its length as series of transverse reinforcing rods so that the belt is relatively stiff in the transverse direction while being flexible in the length direction thereof;
    said belt having opposed major surfaces that comprise an interior side and an exterior side respectively, said interior side being configured with driving formations for engagement by drive means of the snowmobile, said exterior side having integral ground-engaging traction elements formed thereon;
    said traction elements comprising projecting ribs, each having a height of at least about 1¼ inches, the ribs being spaced along the length of the track in a repeating pattern and together extending over most of the width of the track, wherein each said rib tapers in thickness towards an elongate crest, said rib in the region of the crest being resiliently flexible and having a hardness in the range 50 to 90 durometer, each said rib extending at least somewhat in the transverse direction of the track, and substantially all of said ribs extending at an angle with respect to said transverse direction that is within the range of 0° to 45° rearwardly towards the closest longitudinal edge of said belt.

2. A snowmobile track as claimed in claim 1 wherein said angle is in the range of 15° to 30°.

3. A snowmobile track according to claim 1 wherein said angle is approximately 20°.

4. A snowmobile track as claimed in claim 1 wherein the durometer hardness of said crest region of the rib is approximately 70.

5. A snowmobile track as claimed in claim 1 comprising a wide central band separated on each side from narrower peripheral bands by a respective row of holes, said angled ribs being contained in said central band whereas in each said outer band there are ribs that extend substantially parallel to the transverse direction of the track.

6. A snowmobile track as claimed in claim 1 wherein said elongate crest includes a generally flat surface parallel to the surface of the track, and a groove extending along said flat surface.

7. A snowmobile track as claimed in claim 1 wherein the repeating pattern of said ribs is not less than twice the spacing between successive transverse reinforcing rods.

8. A snowmobile track as claimed in claim 7 wherein said repeat pattern corresponds to approximately twice the spacing between successive reinforcing rods, and said ribs are positioned in register with said reinforcing rods.

9. A snowmobile track as claimed in claim 8 wherein certain of said ribs are in register with each reinforcing rod, ribs registering with one reinforcing rod being spaced laterally there along with gaps between them, the ribs in register with the adjacent preceding and succeeding reinforcing rods being in register with said gaps.

10. A snowmobile track as claimed in claim 8 wherein in register with alternate reinforcing rods, the ribs include a central, wide angled V-shaped rib.

11. A snowmobile track as claimed in claim 10 wherein said ribs include a pair of flank ribs in register with each intermediate reinforcing rod.

12. A snowmobile track as claimed in claim 11 comprising a wide central band separated on each side from narrower peripheral bands by a respective row of holes, said central ribs and flank ribs being carried on said central band and the length of one central rib and an adjacent pair of flank ribs in the transverse direction corresponding to the spacing between said rows of holes such that considered in the longitudinal direction, the inboard ends of said flank ribs are in register with the outboard ends of said central rib.

13. A snowmobile track as claimed in claim 11 comprising a wide central band separated on each side from narrower peripheral bands by a respective row of holes, said central ribs and flank ribs being carried on said central band and the length of one central rib and an adjacent pair of flank ribs in the transverse direction exceeding the spacing between said rows of holes such that considered in the longitudinal direction, the inboard ends of said flank ribs are overlap the outboard ends of said central rib.

14. A snowmobile track as claimed in claim 11 comprising a wide central band separated on each side from narrower peripheral bands by a respective row of holes, said central ribs and flank ribs being carried on said central band and the length of one central rib and an adjacent pair of flank ribs in the transverse direction being less than the spacing between said rows of holes such that considered in the longitudinal direction, the inboard ends of said flank ribs are spaced from the outboard ends of said central rib.

15. A snowmobile track comprising:

an endless belt of reinforced rubber composition having embedded therein at uniform intervals along its length a series of transverse reinforcing rods so that the belt is relatively stiff in the transverse direction while being flexible in the length direction thereof;

said belt having opposed major surfaces that comprise an interior side and an exterior side respectively, said exterior side having integral ground-engaging traction elements formed thereon;

said traction elements comprising projecting ribs each having a height of at least about 1¼ inches, the ribs being spaced along the length of the track in a repeating pattern and together extending over most of the width of the track, each said rib extending at least somewhat in the transverse direction of the track, and extending at an angle with respect to said transverse direction that is within the range of 0° to 45° rearwardly towards the closest longitudinal edge of said belt, successive ribs that are in register considered in the length direction of the track being spaced apart by a distance corresponding to twice the interval between said transverse reinforcing rods.

16. A snowmobile track as claimed in claim 15 wherein the majority of said ribs extend at an angle with respect to the transverse direction within the range 15° to 30° rearwardly.

17. A snowmobile track as claimed in claim 15 wherein each said rib tapers in thickness towards an elongate crest and in the region of the crest is resiliently flexible, comprising material having a hardness in the range 50 to 90 durometer.

18. A snowmobile track as claimed in claim 15 wherein the ribs are positioned in register with said reinforcing rods, the ribs registering with one reinforcing rod being spaced laterally there along and separated by gaps, the ribs in register with adjacent preceding and succeeding reinforcing rods being in register with said gaps.

19. A snowmobile track as claimed in claim 18 wherein the majority of said ribs are oriented at an angle with respect to said transverse direction within the range 15 to 30 degrees rearwardly towards the closest longitudinal edge of said belt, and wherein each rib tapers in thickness towards an elongate crest, said rib in the region of said crest being resiliently flexible and having a hardness in the range of 50 to 90 durometer.

* * * * *